Re. 24387

MAGNETIC SWITCHING CIRCUIT

Filed Aug. 9, 1954

INVENTORS
RAYMOND STUART-WILLIAMS
MILTON ROSENBERG
BY Lyon & Lyon
ATTORNEYS 2,720,597
Patented Oct. 11, 1955

2,720,597

MAGNETIC SWITCHING CIRCUIT

Raymond Stuart-Williams, Pacific Palisades, and Milton Rosenberg, Santa Monica, Calif., assignors to International Telemeter Corporation, Los Angeles, Calif., a corporation of Delaware Application August 9, 1954, Serial No. 448,605

8 Claims. (Cl. 307—88)

This invention relates to switching circuits and, more particularly, is an improved switching circuit of the type employing magnetic cores.

The employment of magnetic cores in a switching-circuit arrangement is described in an article by Jan A. Rajchman in the RCA Review for June 1952, entitled Static Magnetic Matrix Memory and Switching Circuits. Also, the employment of a magnetic core delay line has been described in an article by An Wang in the Proceedings of the IRE for April 1951, entitled Magnetic Delay Line Storage.

The magnetic switches as described by Rajchman are useful in driving the magnetic cores of a memory. The value of these switches is that the number of lines which need be switched in order to write into or read from a large array of magnetic cores in a memory is considerably reduced. The switches described heretofore have been of the type in which a substantially random access for switching purposes is enabled. The address of each switch core which represents the address of a desired column or row must be established in the driving tubes used to control the switch. This mechanism is clearly explained in the article by Rajchman. Where sequential or cyclic switching for operation of a magnetic memory or other device is desired, the employment of the switch shown by Rajchman would require establishment of each address in sequence for driving purposes. This leads to a complexity of electronic apparatus and associated equipment.

An object of the present invention is to provide a simple shifting switch which permits sequential operation with a minimum of external electronic apparatus.

A further object of the present invention is the provision of a shifting switch which is more reliable in operation than those made heretofore.

Still a further object of the present invention by the substitution of magnetic cores for functions heretofore performed by electronic equipment is the provision of a switch which is more reliable and more inexpensive to operate than those previously known.

These and further objects of the present invention are achieved in an embodiment wherein three columns of magnetic cores are provided. All the cores in the columns are initially saturated in a condition at one polarity except a single core in the second column, which is saturated at the opposite polarity. A drive is applied to the first and second column of cores to drive the cores toward said other polarity, but in view of the connections between these columns, the only core in the first column which is so driven is the one opposite the core in the second column having said other polarity. Next a drive to reset the cores in the first column and in the third column to saturation at said one polarity is applied. This restores all the cores in the first column and in view of the couplings between the cores in the third column and the cores in the second column, the second and third column cores are reset except for the core which is next to the one previously in the other condition of saturation.

Thus the switch is in condition so that upon the next drive the only core that will turn over in the first column is the one next to the one that previously was turned over. If desired, a fourth column of cores can be provided and coupled to the second column. Using the proper interconnections, this column of cores may be employed to prevent a shift in the second column of cores. A fifth column of cores may be provided coupled to the second column of cores in such manner that when the third and fourth core columns are inhibited and the second column of cores are allowed to operate the shift in the switch occurs in the reverse direction.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 1, 2, 3:
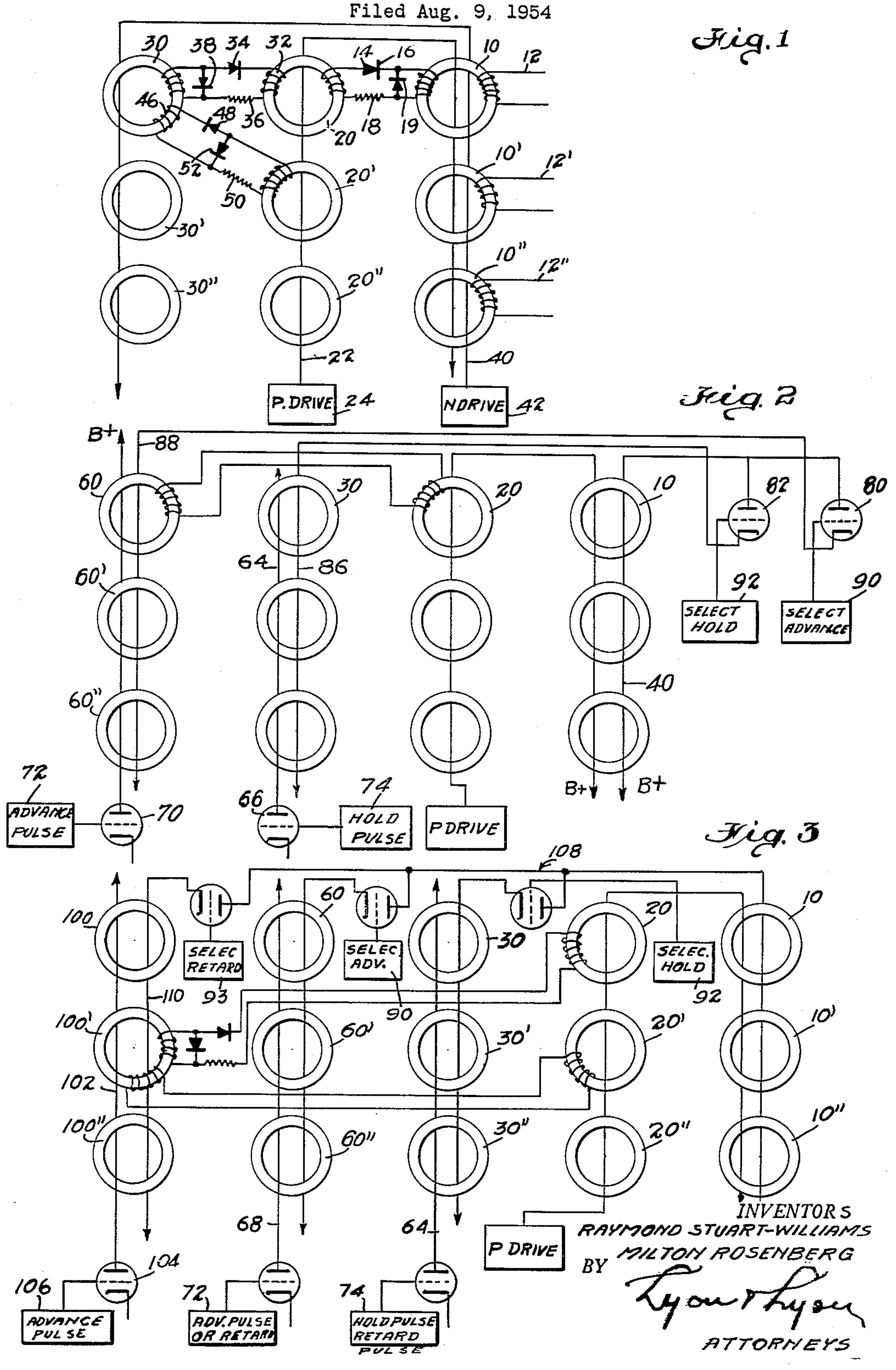
Figure 1 shows an embodiment of the invention of the shifting switch.
Figure 2 shows another embodiment of the shifting switch wherein, when desired, the shift is prevented.
Figure 3 shows a third embodiment of the shifting switch wherein, when desired, a shift can be made forward, backward, or the shift prevented.

Referring now to Figure 1, there is shown an embodiment of the invention wherein a sequential switch operation may be achieved. Three columns of cores 10, 20, 30 are employed with the cores 20 of the second column preferably being larger than the cores 10, 30 of the first or third columns. In order to more easily explain the invention, let it be understood that when a core is driven to saturation at one polarity, this will be designated as the "P" condition of the core. The other saturation condition will be designated as "N."

The cores employed are preferably those having substantially rectangular hysteresis characteristics. It is known that when a driving pulse is applied to a core having characteristics of this nature and the core is driven, for example, from P to N, a coil which is inductively coupled to that core will have a voltage induced therein. The duration of the induced voltage depends upon the turnover time of the core. This is not an instantaneous event but does persist for a period which is measurable and which exists for intervals on the order of a microsecond.

Regarding the switch shown in Figure 1, let it be assumed that the cores in the first, second, and third columns are all in condition N except one, 20, in the second column, which is in condition P. The output from the switch to the memory or other load to be driven is derived with output coils 12 from each one of the cores 10, 10′, 10″ in the first column. The cores 20, 20′, 20″ in the second column are respectively coupled inductively to a different one of the cores in the first column through a coil 14 having a series rectifier 16 and resistor and a shunt rectifier. The number of turns of the coil 14 on a core in the second column is greater than the number of turns of the coil on the core in the first column. The direction of the turns is made such that, when a core in the second column is driven from N to P, it applies a drive on the associated core in the first column which tends to make that core stay in the N condition.

A P-drive coil 22 is inductively coupled to all the cores in the second and first columns in series. A P drive is applied to this coil from a source 24 so that the current pulse used for driving is first applied at the core 20″ in the second column. Due to the delay line effects of the cores and their coupling, the cores 20, 20′, 20″ in the second column begin to turn over to P before the driving pulse reaches the cores 10, 10′, 10″ in the first column.

In view of this, all the cores in the second column apply inhibiting currents to the cores in the first column—that is, all except the core 10 which is already in P. These inhibiting effects prevent the P drive from the coil 22 on the first column of cores from turning these cores to P except the one core 10 which does not receive any inhibiting effect. This core is turned over from condition N to condition P with the result that an output voltage is induced in its output coil 12. It should be noted that at this time all the cores in the second column are in condition P and only one core 10 in the first column is in condition P. The remaining cores 10', 10'' in the first column are in condition N.

The cores in the second column are each also coupled to associated cores in the third column by a coil 32, a series rectifier 34, a resistor 36, and a shunt rectifier 38 in a manner to drive a third column core from N to P whenever an associated second column core is also so driven. Thus all the cores in the third column are driven to condition P except the one 30 connected to the core 20 in the second column which was in P when the switching cycle was commenced. This third column core 30 remains in condition N. An N-drive coil 40 is coupled to all the cores in the first and third columns in serial fashion. An N drive from a source 42 is applied to the N-drive coil which results in resetting the switched core 10 in the first column to N and all the cores in the third column not already in N to N.

It will be noted that the cores in the third column are all respectively coupled to a second column core next to the one from which they receive a drive. This coupling also employs a coil 46, a series rectifier 48, a series resistor 50, and a shunt rectifier 52 in a manner to permit a turned-over third column core (going from P to N) to apply an N drive to the second column core. Thus all the second column cores are reset to N except the core 20' next to the one which was at P at the beginning of the switching cycle. The switch is now in condition for the next switching cycle at which time the only output core to be turned over will be the one 10' next to the one that was turned over at the first switching cycle. Thus, by the simple application of first a P drive and then an N drive, the shifting switch is made to operate in sequence and complex addressing circuitry is eliminated. The rectifiers and resistors employed in each of the coupling means are connected to insure that the drives are applied between cores in the directions stated previously and are not reciprocal when the core which has received the drive is driven back to its initial condition by the N drive.

Two switches of the type described in Figure 1 may be employed to operate a core plane made of magnetic cores arrayed in columns and rows. One of the switches can be employed to drive column cores and the other can be employed to drive row cores. The switches are made endless—that is, the last core 30'' in the third column is connected to drive the first core in the second column 20. Thus cyclic operation is insured. Furthermore, the switch may be made any desired size.

Reference is now made to Figure 2 of the drawing. Therein is shown apparatus for stopping the shifting operation of the switch and permitting the switch drive to come from the same core as long as it is desired. This is achieved by employing a fourth column of cores 60, 60', 60''. The first three columns of cores are interconnected in the same manner as described previously. The fourth column of cores is employed as follows. Each core 60 of the fourth column is coupled to an associated core 20 in the second column by a coil 62 in a manner such that whenever the second column core is driven the associated fourth column core is likewise driven, and vice versa. There is also provided an inhibit coil 64 driven by a tube 66 which is coupled to all the cores in the third column and another inhibit coil 68 driven by a tube 70 which is coupled to all the cores in the fourth column. At the start of a cycle, all the cores 60, 60', 60'' in the fourth column are at N.

If it is desired to achieve an advancing pulse action, then the fourth column cores are inhibited by applying a pulse from an advancing pulse source 72 to the tube 70 driving the fourth column inhibit coil 68. The inhibit coil is maintained excited until the cycle of operation is finished. If it is desired to achieve a holding switching action, that is, no advance in the switching of the cores in the first column, then the inhibiting coil 64, coupled to the cores in the third column, is excited by the tube 66 to which it is connected and the hold pulse source 74 maintains this tube excited for the duration of the holding cycle. The N-drive coil 40, which in the embodiment shown in Figure 1 was coupled to all the cores in the first and third column, now is coupled to all the cores in the first column, and, in addition, through two switching tubes 80, 82 may connect in series with an N-drive coil 86, 88 in either the third column or the fourth column through the one of two switching tubes which is selected. By applying a pulse from a select advance source to the grid of one of the switching tubes 80, the N-drive coil through the first and third core columns is excited and operation occurs exactly as was described for Figure 1.

Let us consider the operation of the switch for a holding operation. The operation of a switch for an advancing operation will not be described for the reason that during this operation the cores in the fourth column are inhibited against operation and, therefore, play no part. Instead, the condition will be considered when a hold pulse is applied to inhibit the operation of the cores in the third column. As previously described initially, all the cores in the first, second, and fourth column are at N except one core 20 in the second column. A P drive is applied and, as before, all the cores in the second column that are not already in P are driven to P, thus inhibiting the cores in the first column. The only core in the first colmun that is driven to P will be the one 10 which is not inhibited. As a result of this P drive on the second column, all the cores in the fourth column will be driven to P except one core 60, which is coupled to the core 20 in the second column which was in P to begin with. Thus, when the N drive is applied by exciting from the select hold source 92, the tube 82 which connects the N-drive coil of the first column 40 with the N-drive coil 88 of the fourth column all the cores in the fourth column which are not already in N are driven to N, thus restoring the cores in the second column back to N. This leaves the same second column core 20 which was at P at the beginning of the cycle still at P. Accordingly, when the next shifting switch operation occurs, the switch does not shift but the core 10 in the first column which turned over to P previously again will turn over to P upon the second switching operation. Thus by applying the inhibit current to either the third or fourth column of cores and by exciting the proper N restore coil, the switch can be made to advance or stand still for successive operations.

Figure 3 shows another embodiment of the invention which permits an advance, a standstill, or a backing up operation of the switch. This embodiment of the invention should be fairly obvious in view of the description of the operation of the switches shown in Figures 1 and 2. What is employed here is a fifth column of cores 100, 100', 100'' which are coupled to the preceding cores in the second column instead of the succeeding cores. An inhibiting coil 102 and driver tube 104 and exciting pulse source 106 is required for this fifth column and also another tube 108 for selecting the N restore coil 110 passing through the fifth column of cores. When an advancing or holding operation is required, the switch is operated in the manner described previously for Figures 1 and 2. The fifth column of cores is maintained inhibited during this operation. When a retard operation is desired, the inhibit coils 64, 68 for the third and fourth columns are excited by applying exciting pulses to the respective grids.

A description of the operation of the switch now is exactly the same as was described for Figure 1. The inhibit coils 64, 68 serve the purpose of removing the third and fourth columns from consideration in the switch operation. This time when the cores 100 in the fifth column are driven from P to N, they restore the cores preceding the ones from which they receive their P drive instead of restoring the cores succeeding the ones from which they receive their P drive as shown in Figure 1. As previously indicated, the N restore coil is selected by applying a selecting signal to the grid of the tube 108 which couples the N restore coil 40 in the first column with the N restore coil 110 in the fifth column.

Accordingly, a shifting switch has been described herein which operates in sequence either in a forward or in a reverse direction and which can also be operated to repeat an output from the same core. The novel shifting switch permits cyclic operation using less expensive apparatus than used heretofore.

We claim:

1. A magnetic-core shifting switch comprising a first, second, and third column of magnetic cores, each of said cores being substantially saturable in either of two polarities, all the cores in said first and third columns and all but one of the cores in said second column being substantially saturated at said one of said two polarities, said one core in said second column being substantially saturated at said other of said two polarities, means to apply a drive to saturation at said other polarity to the cores of said first and second column, first means responsive to the changing of said cores in said second column to saturation at said other polarity to inhibit the drive on said cores in said first column, second means responsive to the changing of said cores in said second column to saturation at said other polarity to drive said cores in said third column to saturation at said other polarity, means to apply a drive to said cores in said first and third columns to saturation at said one polarity, and third means responsive to the cores in said third column changing toward saturation in said one polarity to drive succeeding cores in said second column to saturation at said one polarity.

2. A magnetic-core shifting switch as recited in claim 1 wherein said first means includes a plurality of coils a different one of which inductively couples a different core in said second column to a different core in said first column and a unilateral impedance for each coil and connected in series therewith; wherein said second means includes a plurality of coils, a different one of which inductively couples a different core in said second column to a different core in said third column, and a unilateral impedance for each coil and connected in series therewith; wherein said third means includes a plurality of coils, a different one of which inductively couples a different core in said third column to the core in said second column succeeding the second column core to which said third column core is coupled by said second means, and a unilateral impedance for each coil and connected in series therewith.

3. A magnetic-core shifting switch as recited in claim 1 wherein said means to drive said first and second core columns includes a coil inductively coupled to all the cores in said columns and said means to drive said first and third columns includes a coil inductively coupled to all the cores in said columns.

4. A magnetic-core shifting switch comprising a first, second, and third column of magnetic cores, each of said cores being substantially saturable at either of two polarities, all of the cores in said first and third columns and all but one of the cores in said second column being substantially saturated at said one of said two polarities, said one core in said second column being substantially saturated at said other of said two polarities, means to apply a drive to all the cores in said first and second column toward saturation at said other of said two polarities, means coupled between each of the cores in said second column and a different one of the cores in said first column to inhibit said cores in said first column responsive to the core in said second column changing to saturation at said other polarity whereby only the core in said first column coupled to said one core in said second column is driven toward saturation at said other polarity, means coupled between each of the cores in said second column and a different one of the cores in said third column to drive said cores to saturation at said other of said two polarities responsive to the core in said second column changing to saturation at said other polarity whereby all the cores in said third column but the one coupled to said one core in said second column are driven toward saturation at said other of said two polarities, means to apply a drive to said first and third columns of cores to drive said cores toward saturation at said one polarity, and means coupled between each of the cores in said third column and a different one of the cores in said second column other than the cores to which it is already coupled to drive a second column core towards said one condition of saturation responsive to the core in said third column changing to said one condition whereby all the cores in said second column are driven substantially towards said one condition of saturation but the one coupled to said third column core which was left in said one condition of saturation prior to application of a drive from said means to apply a drive to said first and third columns.

5. A magnetic-core shifting switch comprising a first, second, and third column of magnetic cores, each of said cores being substantially saturable in either of two polarities, a plurality of first inductive coupling means each of which inductively couples a different one of the cores of said second column with a different one of the cores of said first column, each of said first means including a unilateral current flow means, a plurality of second inductive coupling means each of which inductively couples a different one of the cores of said second column with a different one of the cores of said third column, each of said second means including a unilateral current flow means, a plurality of third inductive coupling means each of which inductively couples a different one of the cores of said third column with a different one of the cores of said second column other than the core to which each said third column core is already coupled, each of said third means including a unilateral current flow means, means to apply a drive to said second and first rows of cores to drive said cores toward core saturation at one of said two polarities, and means to apply a drive to said first and third rows of cores to drive said cores toward core saturation at the other of said two polarities.

6. A magnetic-core shifting switch as recited in claim 1 wherein said unilateral current flow means in each of said first means is connected to permit current flow from said core in said second column to said core in said first column, said unilateral current flow means in each of said second means is connected to permit current flow from said core in said second column to said core in said third column, and each said unilateral current flow means in said third means is connected to permit current flow from said core in said third column to said core in said second column.

7. A magnetic-core shifting switch comprising a first, second, third, and fourth column of magnetic cores, each of said cores being substantially saturable in either of two polarities, a plurality of first inductive coupling means each of which inductively couples a different one of the cores of said second column with a different one of the cores of said first column, each of said first means including a unilateral current flow means, a plurality of second inductive coupling means each of which inductively couples a different one of the cores of said second column with a different one of the cores of said third column, each of said second means including a unilateral current flow means, a plurality of third inductive coupling means each of which inductively couples a different one of the cores of said third column with a different one of the cores of said second column other than the core to which each said third column core is already coupled, each of said third means including a unilateral current flow means, a plurality of fourth inductive coupling means each of which inductively couples each of the cores in said second column with a different one of the cores in said fourth column, means to apply an inhibiting drive to said fourth column of cores when an advancing switch operation is desired, means to apply an inhibiting drive to said third column of cores when no advancing switch operation is desired, means to apply a drive to said second and first rows of cores to drive said cores toward core saturation at said one of said two polarities, means to apply a drive to said first and third rows of cores to drive said cores toward core saturation at the other of said two polarities when it is desired to obtain an advancing switch operation, and means to apply a drive to said first and fourth rows of cores to drive said cores toward core saturation at the other of said two polarities when no advancing switch operation is desired.

8. A magnetic-core shifting switch comprising a first, second, third, fourth, and fifth column of magnetic cores, each of said cores being substantially saturable in either of two polarities, a plurality of first inductive coupling means each of which inductively couples a different one of the cores of said second column with a different one of the cores of said first column, each of said first means including a unilateral current flow means, a plurality of second inductive coupling means each of which inductively couples a different one of the cores of said second column with a different one of the cores of said third column, each of said second means including a unilateral current flow means, a plurality of third inductive coupling means each of which inductively couples a different one of the cores of said third column with a different one of the cores of said second column other than the core to which each said third column core is already coupled, each of said third means including a unilateral current flow means, a plurality of fourth inductive coupling means each of which inductively couples each of the cores in said second column with a different one of the cores in said fourth column, a plurality of fifth inductive coupling means each of which inductively couples each of the cores in said second column with a different one of the cores in said fifth column, each of said fifth inductive coupling means including a unilateral current flow means, a plurality of sixth inductive coupling means each of which couples inductively each of the cores in said fifth column with a different one of the cores in said second column which are located in an opposite direction to the cores to which said third means are coupled, means to apply an inhibiting drive to said fourth and fifth columns of cores when an advancing switch operation is desired, means to apply an inhibiting drive to said third and fourth columns of cores when a reversing switch operation is desired, means to apply an inhibiting drive to said third and fifth columns of cores when neither advancing nor retarding switch operation is required, means to apply a drive to said second and first columns of cores to drive said cores toward core saturation at said one of said two polarities, means to apply a drive to said first and third rows of cores to drive said cores to core saturation at said other of said two polarities when it is desired to obtain an advancing switch operation, means to apply a drive to said first and fifth row of cores to drive said cores to saturation at said other polarity when it is desired to obtain a reversing switch operation, and means to apply a drive to said first and fourth row of cores to drive said cores to saturation at said other polarity when neither advancing nor reversing switch operation is desired.

No references cited.